June 21, 1949.  C. BERKLEY  2,473,700
APPARATUS FOR TESTING THE ACCURACY OF MOVEMENTS
Filed Oct. 6, 1944
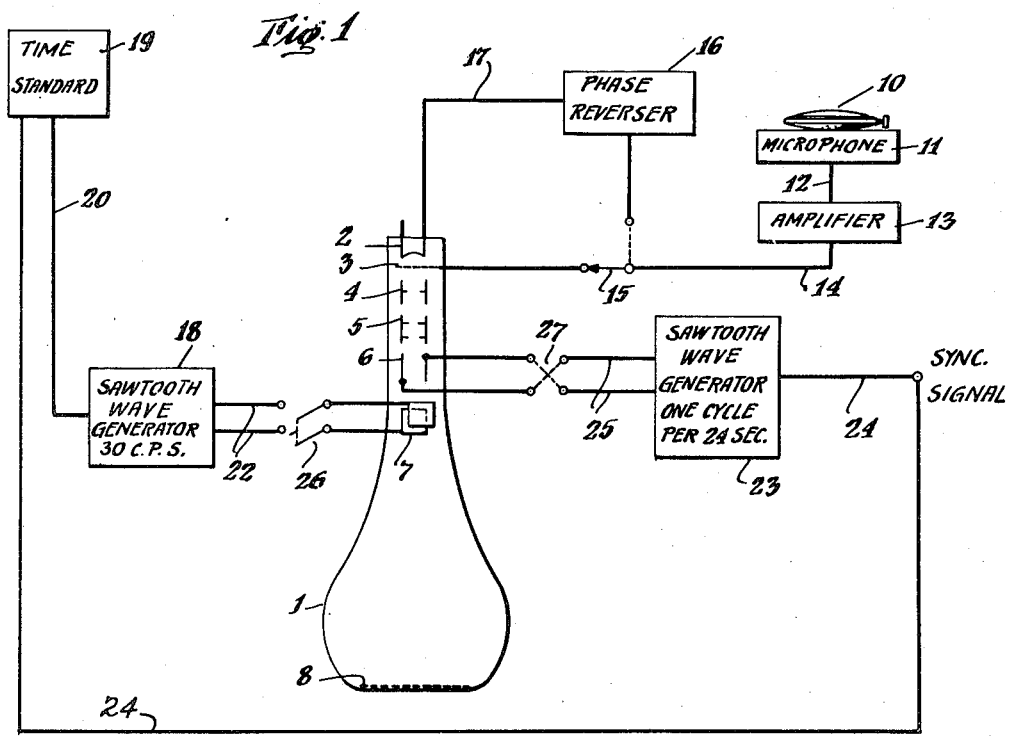
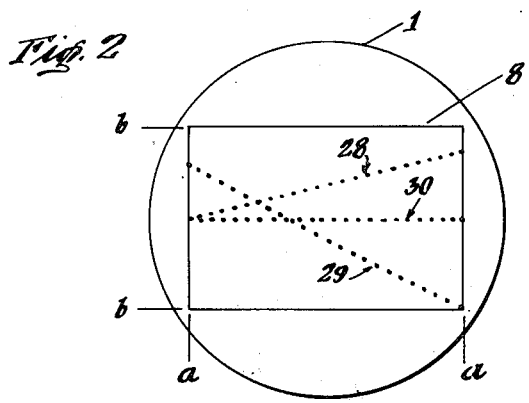
Carl Berkley INVENTOR.
BY Charles W. Mortimer
ATTORNEY Patented June 21, 1949

2,473,700

UNITED STATES PATENT OFFICE 2,473,700

APPARATUS FOR TESTING THE ACCURACY OF MOVEMENTS

Carl Berkley, New York, N. Y., assignor to Allen B. DuMont Laboratories, Inc., Passaic, N. J., a corporation of Delaware Application October 6, 1944, Serial No. 557,526

2 Claims. (Cl. 73—6)

This invention relates to a device for testing or examining the frequency and time variations of electrical and mechanical devices for the purpose of determining variations in their instantaneous as well as their average accuracy.

In carrying out the invention a raster is provided upon the screen of a cathode-ray tube in such a way that this raster can be utilized as a standard for checking frequencies of different sorts of devices. A signal is obtained from the device that is to be tested and is utilized in controlling the cathode-ray of the tube in such a way that visual signals are produced upon the screen of the tube so that the user is informed as to the accuracy or performance of the device being tested.

This invention can be used, for example, for quickly checking the accuracy of watches and determining how much too fast or too slow they are running; for setting of time fuses; observing the frequency stability of oscillators; studying the hunting in synchronous motors; determining the speed of rotating bodies; determining the rate of heart beats; and checking the accuracy of stepping switches and the like.

A repeating electrical signal is caused to be produced by the object that is to be examined and this signal is caused to produce a pattern, on the screen of a cathode-ray tube, of such a character that accurate information as to the performance of the object can be quickly ascertained.

The invention may be understood from the description in connection with the accompanying drawing, in which—

Fig. 1 is a diagrammatic drawing which shows an illustrative embodiment of apparatus that is suitable for carrying out the invention; and Fig. 2 is a diagram showing a part on an enlarged scale.

In the drawing, reference character 1 indicates a cathode-ray tube that is provided with a cathode 2, control grid 3, first and second anodes 4 and 5, horizontal deflection plates 6, vertical deflection plates 7, and screen 8.

A watch 10, of which the accuracy is to be tested, is placed upon a microphone 11. The electrical signal from this microphone is applied by lead 12 to the amplifier 13, and lead 14 having a switch 15 therein extends from amplifier 13 to the control grid 3 of tube 1. When switch 15 is in the dotted line position the amplifier 13 is connected to the cathode 2 of tube 1 through phase reverser 16 and lead 17.

The sawtooth wave generator 18 is of the known sort which may have a frequency of 30 cycles per second, for example, when watches are to be examined. It is synchronized with any usual time standard 19, which may, for example, be a tuning fork. A synchronizing signal from time standard 19 is applied by lead 20 to the sawtooth wave generator 18. Leads 22 apply the synchronized sawtooth wave from generator 18 to the vertical deflection plates 7 of tube 1.

The sawtooth wave generator 23, which is synchronized with the same time standard that synchronizes generator 18, generates a sawtooth wave that is applied by leads 25 to the horizontal deflection plates 6 of tube 1. The frequency applied to plates 6 may, for example, by a cycle in twenty-four seconds, when watches are being tested.

The switches 26 and 27 are for turning off or disconnecting either one of the sawtooth wave generators 18 and 23 when desired.

The operation is as follows:

The sawtooth wave generators 18 and 23 are kept synchronized by the signals from standard 19 which are applied by lead 20 and lead 24, respectively, to these generators. During the twenty-four second period in which the sawtooth wave signal from generator 23 causes the beam to be deflected horizontally along the screen 8 the sawtooth wave signal from generator 18 causes this beam to be deflected up and down or to go through seven hundred and twenty complete oscillations. The conditions can be caused to be such that the vertical sweep moves the spot from the top to the bottom of the screen during the sweep period and the horizontal sweep moves it from left to right during its sweep period. This produces a raster on this screen 8 which is rectangular in outline and can be adjusted in size by regulating the amplitudes of the sawtooth waves in any of the known suitable ways. In Fig. 2 the horizontal limits are shown by the reference characters a—a and the vertical limits by the reference characters b—b.

When the potential between cathode 2 and grid 3 is so adjusted that the cathode-ray beam in tube 1 is approximatel ystrong enough to render the raster on screen 8 visible and the swtich 15 is in its full line position, the amplified signal of positive polarity from watch 10 applied to grid 3 increases the strength of this beam momentarily so that a bright spot appears upon the raster each time the watch ticks. If the watch is running correctly a horizontal straight row of dots is caused to appear upon the screen. The screen persistence is made sufficiently long to enable the row of dots to be seen. If the row of dots slopes upwardly the watch is running too fast, and if downwardly, it is running too slow. The amount of error can be ascertained from the angle of slope of the row of dots and irregularity of speed shows up by the dots not producing a straight line. Reference character 28 indicates a line showing a watch running fast; reference character 29 one running slow; and reference character 30 one running correctly.

When the switch 15 is turned to the dotted line position the signal from amplifier 13 is applied to the cathode 2 of tube 1, but since its phase is reversed by the phase reverser 16, the effect of applying this reversed signal to cathode 2 is substantially the same as applying the signal to grid 3 with switch 15 closed in its full line position.

If the watch is adjusted as far as possible to give a horizontal blanking line and the pattern is then watched on the screen for a longer period of time than one raster frame, the average as well as the instantaneous accuracy of the watch may be seen. When the watch movement reaches a point where some defect appears in the meshing gears, the watch runs more slowly or speaks up. When this defect is no longer operative the blanking bar again becomes horizontal. By observing the repetition rate of these excursions of the pattern and correlating this rate with the rotational period of each wheel in the mechanism, the defect may be accurately located and corrected.

It is not necessary to open the case of the watch in order to check it, so that the danger of dust and moisture entering the parts and changing the accuracy is obviated.

When desired either one of the sawtooth wave generators 18 and 23 may be turned off, thus giving a single line pattern so that any signal from an irregular source can be readily distinguished from sources of regular signals.

With this invention the operation of the watch can be observed while it is being tested so that it can be quickly ascertained whether it is running too slow or too fast and how much so, as well as whether its speed is constant or variable during the test period. The result of any adjustment of the watch can be seen instantaneously on the screen.

What is claimed is:

1. Apparatus for testing the accuracy of operation of a device said apparatus comprising a cathode-ray tube having an electron gun producing an electron beam, deflecting plates for scanning said beam and a long persistent fluorescent screen energized by said beam, a plurality of sawtooth wave generators connected to said deflecting plates, means for producing electrical signal test pulses from said device, means to apply said signal to said electron gun of said tube to modulate the beam thereof, a time standard pulse generator connected to said sawtooth wave generators to control said sawtooth wave generators and cause said beam of said tube to scan a rectangular pattern, said test pulses applied to said electron gun causing said beam to trace a row of dots on said screen, the angle of said row of dots being a function of the rate of said device, and the alignment of said row being a function of the regularity of said device.

2. A device for testing watches comprising a cathode ray tube having two pairs of deflection plates and a long persistent screen, a first sawtooth wave generator controlled by a time standard device and connected to one of said pairs of plates, a second sawtooth wave generator having a frequency that is a sub-multiple of the frequency of said first named generator and controlled by a synchronizing signal and connected to the other pair of said plates, a microphone producing electrical signals in response to the ticking of said watch, said microphone being connected to said tube to vary the intensity of the cathode ray beam thereof, said beam producing a trace on said screen in the form of a row of dots, the angle of said row being a function of the rate of said device, and the alignment of said row of dots being a function of the regularity of said device.

CARL BERKLEY.

REFERENCES CITED

The following references are of record in the file of this patent:

UNITED STATES PATENTS

| Number | Name | Date |
| --- | --- | --- |
| 2,092,081 | McLennan | Sept. 7, 1937 |
| 2,121,359 | Luck et al. | June 21, 1938 |
| 2,130,134 | Iams | Sept. 13, 1938 |
| 2,280,524 | Hansen | Apr. 21, 1942 |
| 2,358,078 | Kohlhagen | Sept. 12, 1944 |

FOREIGN PATENTS

| Number | Country | Date |
| --- | --- | --- |
| 496,666 | Great Britain | Dec. 5, 1938 |